United States Patent [19]

Anderson et al.

[11] Patent Number: 5,404,010
[45] Date of Patent: Apr. 4, 1995

[54] METHOD OF WELL LOGGING IN FRACTURED SUBTERRANEAN FORMATION

[75] Inventors: Jon A. Anderson; Christopher M. Pearson; Ahmed S. Abou-Sayed, all of Plano, Tex.

[73] Assignee: Atlantic Richfield Company, Los Angeles, Calif.

[21] Appl. No.: 352,637

[22] Filed: May 12, 1989

Related U.S. Application Data

[63] Continuation of Ser. No. 38,694, Apr. 15, 1987, abandoned.

[51] Int. Cl.$^6$ .............................................. G01V 5/04
[52] U.S. Cl. ................................. 250/260; 250/256; 250/259
[58] Field of Search ........................... 250/256, 259, 260

[56] References Cited

U.S. PATENT DOCUMENTS

| | | | |
|---|---|---|---|
| 4,415,805 | 11/1983 | Fertl et al. | 250/260 |
| 4,439,677 | 3/1984 | Martin | 250/260 |
| 4,612,439 | 9/1986 | Chace | 250/256 |
| 4,698,499 | 10/1987 | Smith, Jr. | 250/256 |
| 4,712,424 | 12/1987 | Herron | 250/256 |
| 4,825,073 | 4/1989 | Smith, Jr. et al. | 250/260 |
| 4,857,729 | 8/1989 | Gadeken et al. | 250/260 |

*Primary Examiner*—Constantine Hannaher
*Attorney, Agent, or Firm*—Albert C. Metrailer

[57] ABSTRACT

In a method of logging a well in a subterranean formation which formation has been fractured by injecting proppant tagged with at least one radioactive material into the formation through the well, the improvement comprising: utilizing a spectral gamma-ray tool in performing the logging. By analyzing one or more selected ratios of counting rates at certain energy areas of the spectrum one can determine the vertical height of the fracturing in the formation.

14 Claims, 5 Drawing Sheets

METHOD OF WELL LOGGING IN FRACTURED SUBTERRANEAN FORMATION

This application is a continuation of application Ser. No. 038,694, filed Apr. 15, 1987, now abandoned.

BACKGROUND OF THE INVENTION

This invention relates to an improved method of logging a well in a subterranean formation which has been subjected to a fracturing operation. More particularly, the invention relates to a method of logging a well in a subterranean formation which has been fractured by injecting fluid and proppant material tagged with at least one radioactive material into the formation through the well.

Fracturing subterranean, e.g., hydrocarbon-bearing, formation is well known as a technique to impart porosity to the formation or otherwise render the formation more suitable for economic recovery of the mineral values contained therein. Formation fracturing often involves injecting relatively large volumes of an aqueous fluid and proppant material, e.g., sand, mixture at relatively high pressure through a wellbore into the formation.

Post-treatment fracture height measurements allow the drilling engineer to judge the success of the fracturing operation and to optimize future treatments, if necessary, for other wells in the field. Fracture height information can aid in the diagnosis of post-stimulation problems such as lower production rates or unfavorable water cuts. The data could indicate whether communication has been established between the producing formation and adjacent thief or water zones. Finally, height measurements provide a check on the accuracy of fracture design simulators used prior to the job to predict fracture geometry. Excessive fracture height implies that fracture length is shorter than design.

Current field techniques for fracture height evaluation include temperature logging, spinner surveys, wellbore televiewer, and passive acoustic and radioactive logging. Most techniques provide some direct estimates of fractured zone height at the wellbore. Fracture height determination away from the well is based on inferences. Temperature logs detect the extent of the cooled down zone. Spinner surveys provide a quantitative value of well production or injectivity along the fractured horizons. Seismic methods, such as acoustic methods and the like, are hampered by inhomogeneous formation impedance and/or the need for pumping while the tool is in the hole. The televiewer can only be used with accuracy in open holes.

The most common approach for determining fracture heights uses temperature and gamma-ray logs. Temperature logs made before and after stimulation can be compared to define an interval cooled by injection of the fracturing fluid and thus provide an estimate of the fractured zone. If radioactively marked fluid or proppant is used, post frac gamma-ray logs will show higher levels of activity opposite where the tracer was deposited. These areas can then be equated with the fractured interval.

Both temperature and gamma ray logging techniques are subject to limitations and ambiguities. For example, the temperature log may be difficult to interpret because of low temperature contrast, flowback from the formation before and after the treatment, or fluid movement behind the casing. Currently, gamma-ray logs are provided by gross or total gamma-ray detectors which count gamma rays without distinguishing between the differing energy levels of individual gamma rays. One substantial shortcoming of the current radioactive tracer method is that the gross or total gamma-ray log cannot distinguish between tagged material which is inside the wellbore, in channels or voids in the cement, or actually in place in a fracture. Thus, a given level of activity on the total gamma-ray log may correspond to a small amount of radioactivity inside the borehole or to a larger amount deposited in the fracture. Clearly, it would be advantageous to provide a more discriminating well logging method using radioactive tracers.

SUMMARY OF THE INVENTION

Therefore, one object of the present invention is to provide an improved method for logging a well.

Another object of the invention is to provide an improved method for logging a well in a subterranean formation which has been fractured by injecting material tagged with at least one radioactive material into the formation.

A further object of the invention is to provide an improved method for determining the vertical height of a fracture in a subterranean formation.

Other objects and advantages of the present invention will become apparent hereinafter.

An improved method for logging a well in a subterranean formation which has been fractured by injecting material tagged with at least one radioactive material into the formation through the well has been discovered. The present improvement comprises utilizing a spectral gamma-ray tool in performing the logging. Such spectral gamma-ray tool provides separate counting rates for gamma rays from the radioactive material or materials, having differing energy levels within a spectrum of energy levels.

The present invention provides substantial advantages. For example, the use of a spectral gamma-ray tool provides substantially more useful information relative to a gross or total gamma-ray tool. By comparing various ratios of counting rates at different areas of the spectrum, e.g., the ratio of the counting rate occurring at at least one of the radioactive material's photo-peak area of the spectrum to the counting rate in a reduced average energy area of the spectrum, over a length interval of the well one can at least qualitatively determine the position of the tagged injected material after the fracturing operation. Such determinations are useful in judging the effectiveness of the fracturing operation at the well being logged and also in setting conditions for future fracturing operations at other wells in the same or similar subterranean formations. This is a substantial advance relative to the use of gross or total gamma ray logging tools the data from which does not distinguish the location of the tagged injected material.

BRIEF DESCRIPTION OF THE DRAWINGS

The present invention may be better understood by reading the following description of the preferred embodiments with reference to the accompanying drawings, wherein.

DESCRIPTION OF THE PREFERRED EMBODIMENTS

Although the present invention is not limited by any one or more theories of operation, the following may help in understanding certain aspects of the invention.

As gamma rays pass through matter, they can interact with it in a number of ways. At energies below about 1 MeV (the energy range corresponding to the tracers commonly used with proppants and fracturing fluids), the principal interaction processes are Compton scattering and photoelectric absorption. In the first of these, a gamma ray is scattered by an atomic electron and consequently loses energy and changes direction. In the second process, the gamma ray is completely absorbed and disappears. The relative probability of these interactions depends on the composition of the medium and the energy of the gamma ray. Photo absorption dominates at the low energies and Compton scattering is more likely near 1 MeV. As a result of this situation, a given photon will probably undergo several scattering collisions before it is absorbed.

Radiation transport theory reveals that the intensity of unscattered gamma rays in a collimated beam will decrease exponentially with distance as the gamma rays travel through a material. The decrease is caused by the combined processes of scattering and absorption. Thus, the net effect of passage through a medium is to attenuate the unscattered gamma ray intensity and to produce a flux of lower energy, scattered photons.

Consider a radioactive source producing gamma rays with a single energy, such as Cs-137. If this source were placed next to an ideal spectrometer so that essentially no scattering could take place before the gamma rays entered the detector, the spectrum would show photons only at the source energy, without any low energy background. On the other hand, if a slab of sandstone or any other material were placed between the source and detector, the spectrum would consist of a peak at the source energy and a broad background of scattered gamma rays at lower energy. In the first case, the ratio of unscattered to scattered gamma ray intensities would be infinite. In the second, it would be some finite number that depends on the thickness and composition of the slab. Therefore, this ratio could be used to discriminate between gamma rays that originate close to the detector and those that traversed several inches of formation, pipe, or cement before entering the spectrometer.

Figure 1:
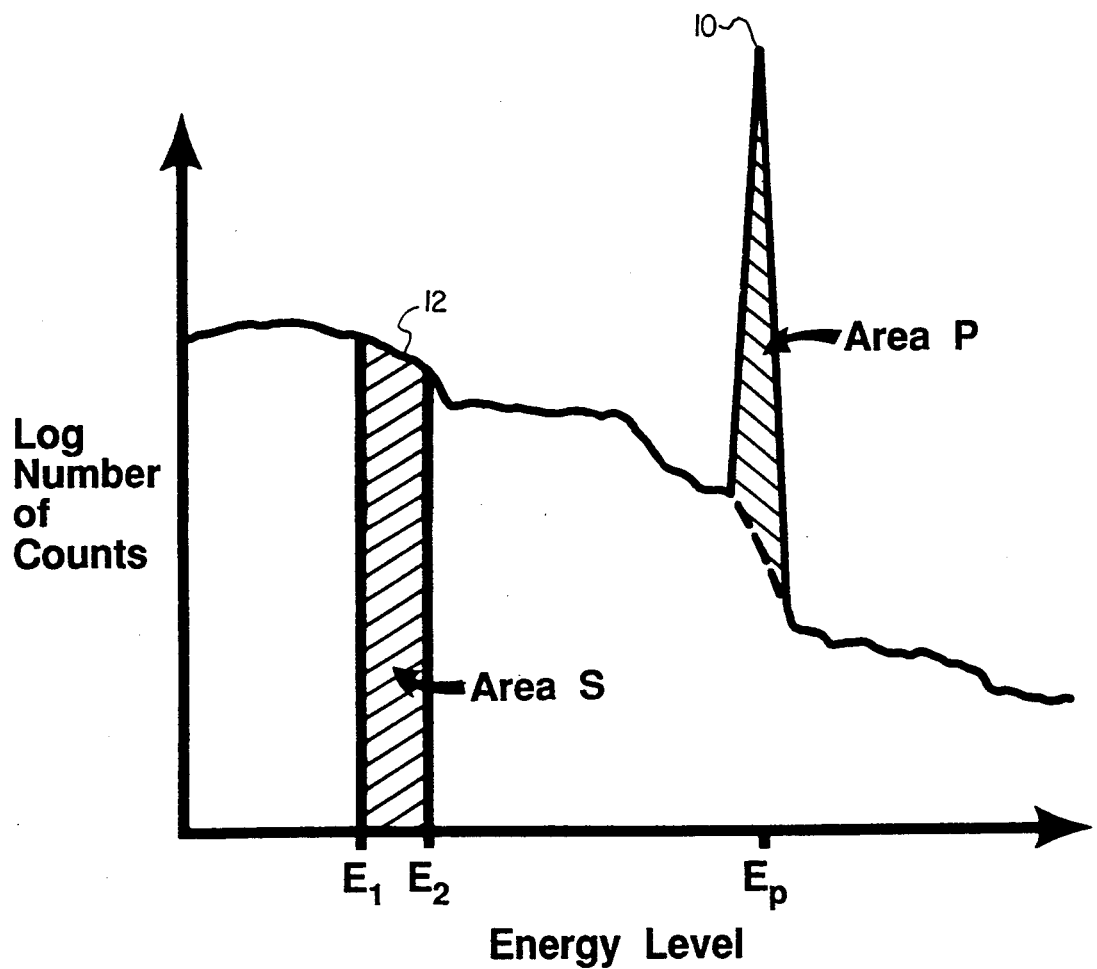
FIG. 1 is a generalized plot of a gamma-ray spectrum for a monoenergetic source.

Real spectrometers interact with photons in the same ways that any other material would, so the spectra obtained even for monoenergetic gamma rays will exhibit a low energy background. The actual spectra obtained represent the convolution of the detector response function with the true spectra of gamma rays entering the spectrometer. With reference to FIG. 1 there is illustrated a generalized plot of the logarithm of number of counts versus energy level for a real spectrometer and a monoenergetic gamma-ray emitter. An area P under the full energy peak 10 will be proportional to the intensity of unscattered gamma rays entering the detector. An area S at a defined lower energy level or range or window 12 from $E_1$ to $E_2$ is proportional to the intensity of scattered gamma rays entering the detector in this energy range or window. Thus, the ratio R, which will be used as a scattering indicator, can be written as:

$$R = P/S$$

Figure 2:
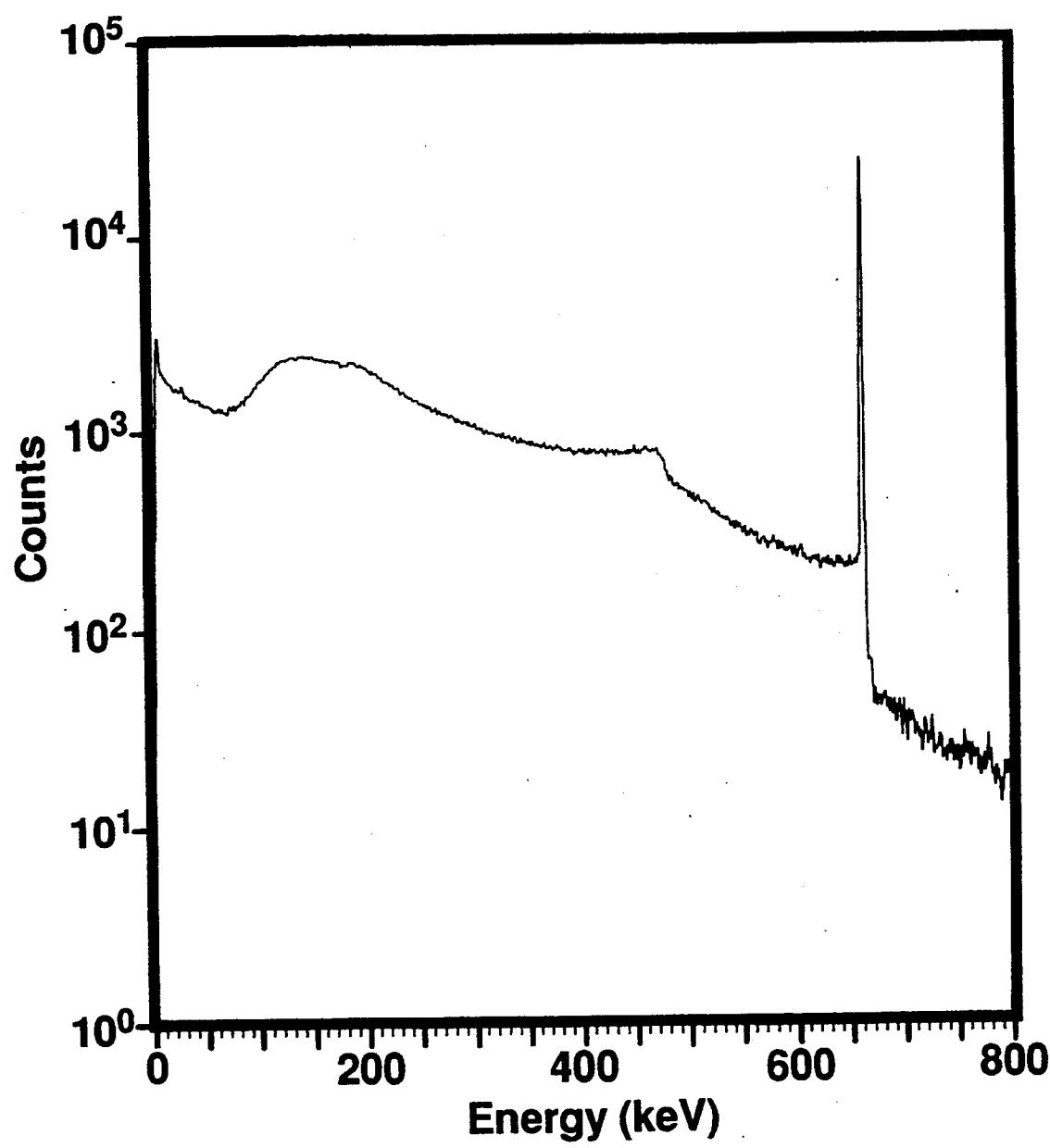
FIG. 2 is an example of an actual gamma-ray spectrum for a monoenergic source such as Cs-137.

This effect can be illustrated by considering the following laboratory experiment. A detector was placed in a borehole in an artificial formation, and a small point source of radiation (Cs-137, 661 keV gamma rays) was then placed 0.75 inches from the detector. Spectra i.e., plots of log counts (proportioned to gamma ray intensity) versus gamma-ray energy in keV, were also taken with the source at depths of 3.5 inches and 5.9 inches from the detector. FIG. 2 is an example of the spectra taken in these experiments.

If an arbitrary background window is established in the region from 220 to 250 keV, the ratios of peak, i.e. 661 keV, to background counting rates were 1.14, 0.61 and 0.386, respectively, for the three depths. These ratios vary inversely with the distance from the detector.

Figure 3:
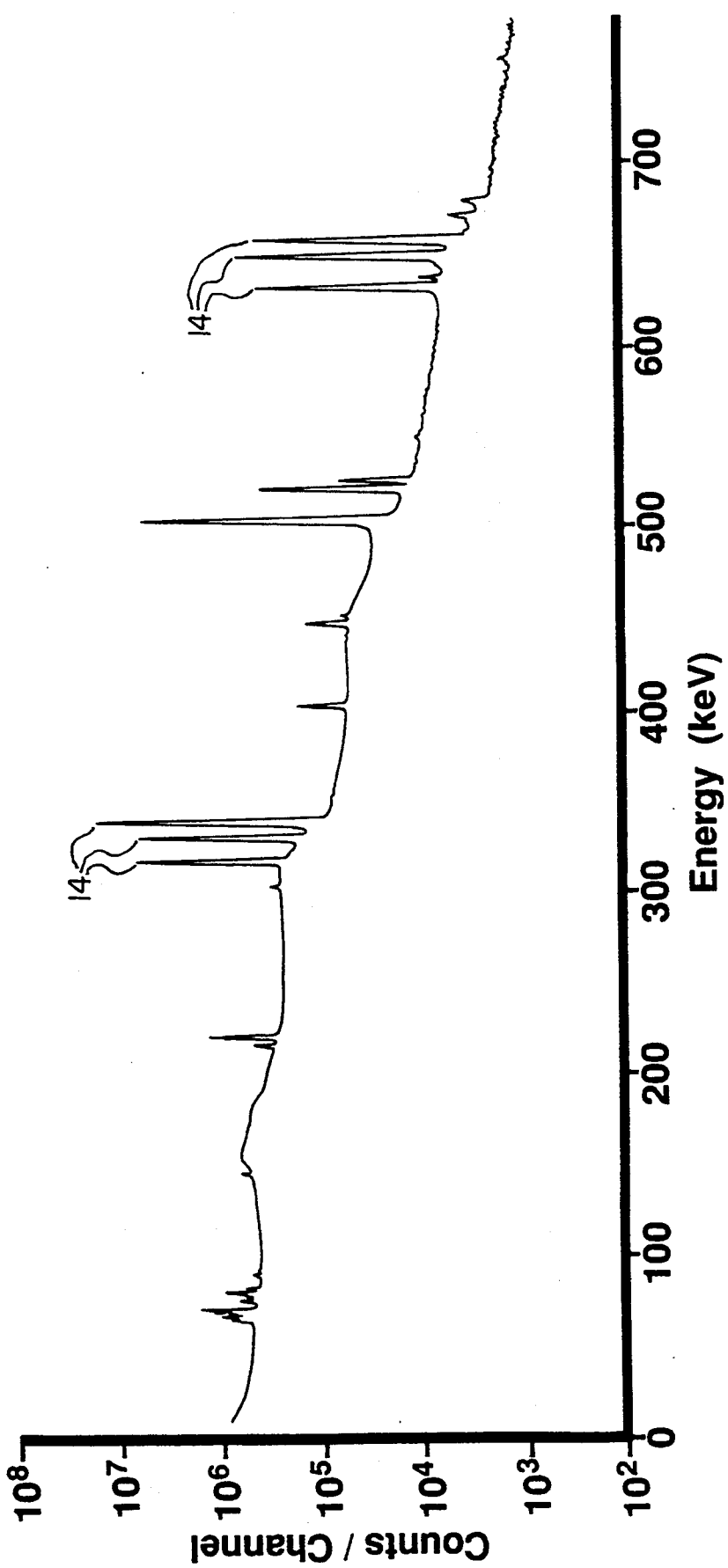
FIG. 3 is an example of an actual gamma-ray spectrum for Ir-192 which has about a dozen major energy peaks.
Figure 4:
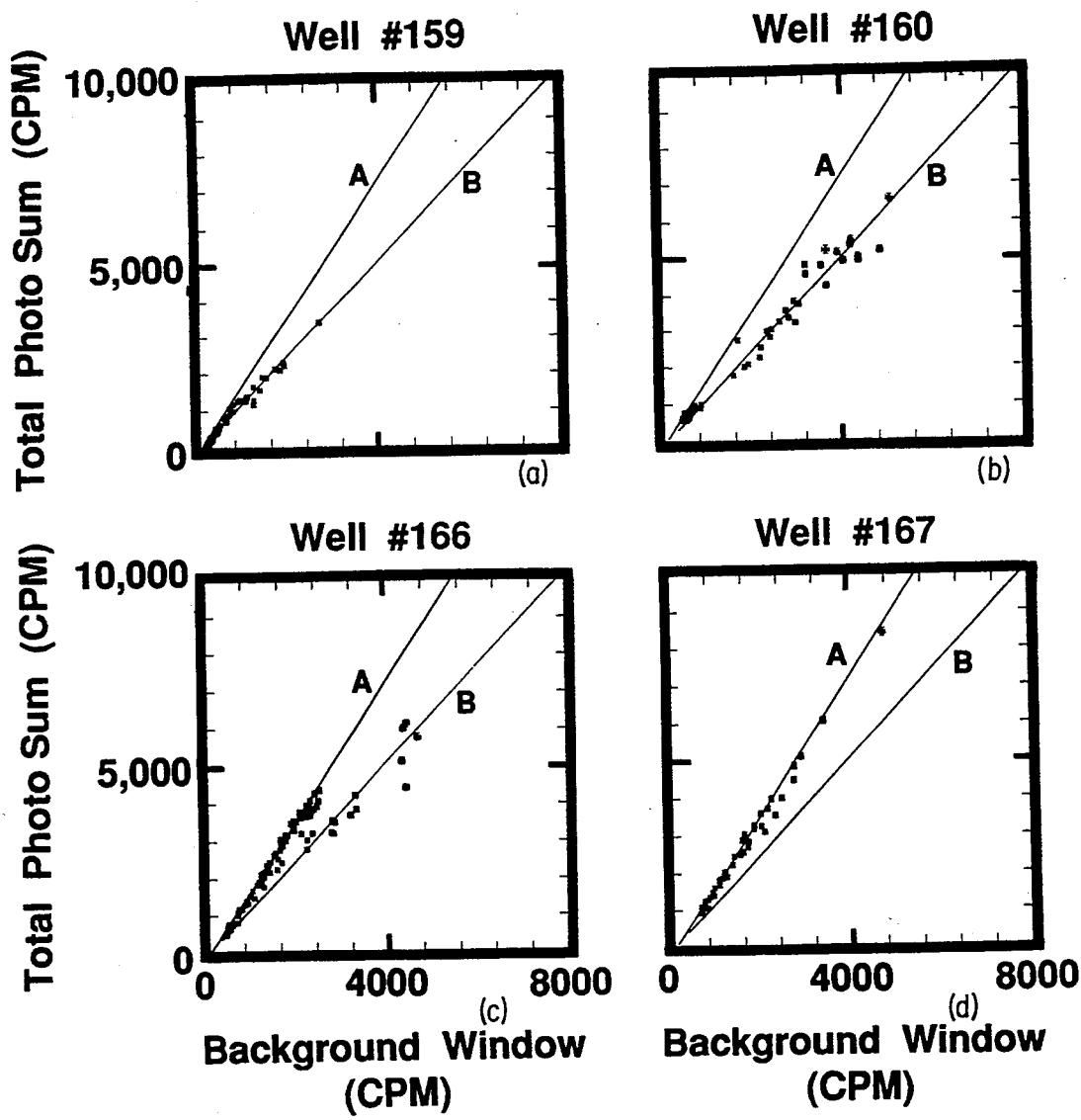
FIGS. 4(a) through 4(d) are cross plots of total photo sum against background window count for four actual wells.

In practical applications the situation is much more complex. For example, FIG. 3 shows that the commonly used tracer Ir-192 has about a dozen major gamma-ray lines 14 instead of only one as illustrated in FIGS. 1 and 2. The photo peak count for such a source will normally include the areas under all or some selected subset of these peaks.

Figure 5:
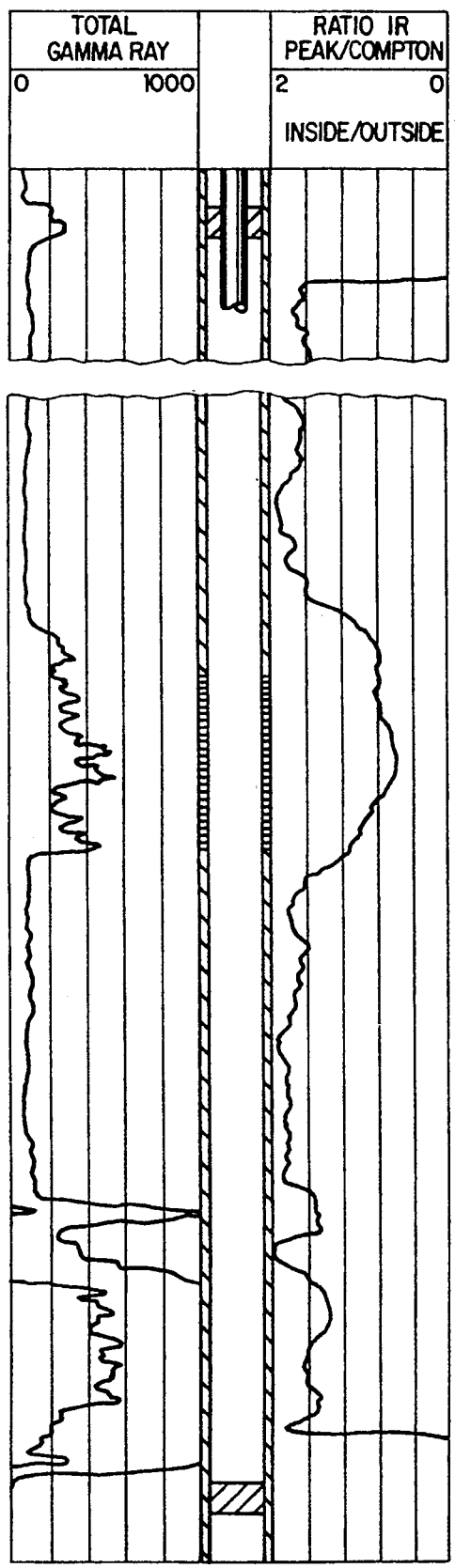
FIG. 5 is an example of typical gamma ray logs showing total count on the left and the ratio measured according to the present invention on the right.

In any event, it has been found that using a spectral gamma-ray tool to provide a log, over a length interval of the well being logged, of at least one ratio of the counting rate occurring at at least one, and more preferably substantially all, of the radioactive material's photo-peak areas of the spectrum to the counting rate in a reduced average energy level area of the spectrum is useful in understanding the extent of induced fracturing of the formation. For example, the vertical height of such fracturing can be determined based on this ratio log. See for example FIG. 5.

Preferably, the reduced average energy area of the spectrum results at least in part from the Compton scattering of gamma rays, e.g., from the radioactive material injected into the well. In one embodiment, the reduced average energy area of the spectrum encompasses substantially the entire spectrum. In another embodiment, the reduced average energy area encompasses a reduced energy area of the spectrum not including any of the radioactive material's photo-peak areas of the spectrum, Preferably, the reduced energy area of the spectrum includes no area of higher energy than the above-noted photo-peak areas of the spectrum.

In one embodiment, the injected material, e.g., proppant and/or fluid, is tagged with a plurality of radioactive materials, or with one radioactive material with multiple gamma-ray lines. This approach allows photo-peak to background and photo-peak to photo-peak ratios to be generated that provide redundant measurements or determinators of the same effect, e.g., the vertical height of a formation fracture. One commercial practice which has been used in the past is to tag phases of the injected material with two isotopes that have different half-lifes. One could then deduce the way in which the injected material entered the formation by making two separate logging runs with a gross or total gamma ray logging tool separated by a time interval long enough to allow the shorter half-life material to decay away. Such deduction can be made in only one logging run using a spectral gamma-ray logging tool.

Any suitable spectral gamma-ray tool or sonde may be utilized in the present invention. At least a portion of the tool, e.g., at least the gamma-ray detector, is preferably placed within the well to provide the desired log. The tool can be such as to generate the desired ratios downhole, or the gamma-ray spectra can be transmitted to the surface and the ratios determined from the spectral data. Either a low resolution, e.g., NaI(Tl) or equivalent, detector or a high resolution, e.g., intrinsic germanium, Ge(Li) or equivalent, detector can be used. Since the precision of the measurement of the peak area or areas is important, the high resolution instrument is preferred.

Preferably, a collimator is used on the detector. Such collimators tend to increase the sensitivity of the method since such devices reduce the number of gamma rays entering the detector from locations up or down the borehole, i.e., gamma rays from proppant that is behind the casing but is above or below the current location of the detector.

Logs can be generated either in a continuous, moving tool mode or in a stationary mode in which the tool is stopped at selected locations in the borehole.

The present improved method provides for more accurate measurement of the height of hydraulically induced fractures in a formation by showing where radioactive tracer material has been deposited behind casing and locating fluid flow channels which exist in the cement. It also provides more accurate identification of which zones have been fractured in a multiple zone completion.

The following nonlimiting examples, illustrate certain embodiments of the present invention.

EXAMPLES 1 TO 4

Four wells in a shallow (4100 feet), carbonate west Texas oil field were hydraulically fractured and logged. The reservoir consists of a dolomite pay zone (55-70 ft. thick) surrounded by two sandy dolomite layers (each 25-30 ft. thick). The top layer was softer than the pay zone (lower Young's modulus). The lower layer had higher permeability and higher water saturation. It had produced oil earlier and was waterflooded to essentially its initial reservoir pressure. The pay zone and the layer immediately above were both oil producers. Production caused the reservoir pressure to decline by 800-900 psi prior to fracturing.

The standard fracture treatment procedure performed on each of the four wells is given in Table 1 (where ppg means pounds per gallon).

TABLE 1

| COMPLETION AND STIMULATION INFORMATION | | |
|---|---|---|
| Well Number | Perforated Depth (Ft.) | Number (and Size) of Perforations |
| 159 | 4102-4147 | 9 (0.42") |
| 160 | 4083-4127 | 9 (0.42") |
| 166 | 4106-4154 | 8 (0.42") |
| 167 | 4075-4121 | 9 (0.50") |
| STIMULATION PROCEDURE | | |

Fluid - 40# HPG with 5% diesel
Proppant - Ottawa Sand

TABLE 1-continued

| Injection Rate - 12 BPM | |
|---|---|
| Pumping Schedule: | |
| PAD | 60 bbl. |
| 2 ppg | 24 bbl. fluid, 20/40 mesh sand |
| 3 ppg | 24 bbl. fluid, 20/40 mesh sand |
| 4 ppg | 24 bbl. fluid, 20/40 mesh sand |
| 5 ppg | 24 bbl. fluid, 20/40 mesh sand |
| 5 ppg | 48 bbl. fluid, 12/20 mesh sand |
| 6 ppg | 48 bbl. fluid, 12/20 mesh sand |
| Flush | 50 bbl. |

Temperature, standard gross or total gamma ray, and spectral gamma-ray logs were made before and after each treatment. The isotope used to tag the proppant was Ir-192, a standard choice for fracture height evaluation. Tracer was added at a rate of 1.5 mCi per 1000 pounds of frac sand. On wells 159 and 166 the isotope was added at the blender, and for wells 160 and 167 it was injected at the wellhead using a high pressure pump. Particular attention was paid to cutting the injection of tagged material prior to the end of the final sand stage. For wells 159 and 166, injection was stopped 50 barrels before the flush was started, and for wells 160 and 167, 30 barrels before flush. All of the treatments were conducted down 5.5 in., 15.5 lb. casing. The spectral gamma-ray tool has a 3.25 in. outside diameter which necessitated the tubing and sucker rod string being pulled from each well.

The gamma ray spectroscopy logs were made using an experimental high-resolution germanium detector and a downhole, 4096 channel pulse height analyzer. One spectrum was acquired every 20 seconds during the logging runs with the spectral gamma-ray tool. Since the tool was moving at about 5 feet per minute, each raw spectrum represented data from a 1.7-foot vertical interval. In the analysis of this data, the major lines between 295 and 612 kev were used to determine peak counting rates, and a window extending from 220 keV to 250 keV was used to determine the scattered counting rate.

The gross or total gamma-ray log for well 159 provided a textbook example of fracture height evaluation. However, the gross or total gamma-ray logs run in the other wells immediately after stimulation exhibited zones of high gamma ray activity that reached upward from the producing interval for hundreds of feet. In the case of well 166, the extended zone of activity was also punctuated by localized spikes of high count rate. There are three possible explanations for these unusual features.

1. The induced fracture actually extended over this region.
2. The radioactive material had flowed up through channels in the cement behind the casing.
3. The radioactive material was still within the borehole.

The gross gamma-ray logs provided no basis to select a correct answer. However, the vertical ranges of the gamma ray anomalies in wells 160 and 166 were so large that it was not plausible to support that they were entirely due to material in the created fractures. The third possibility, suspension of the tagged material inside the borehole, was supported by two additional observations. First, repeat runs of the gross gamma-ray log for well 166 showed that the location and intensity of the hot spikes changed. This suggests a situation in which "blobs" or "channels" of radioactive material were floating in the borehole fluid. Second, a subsequent gross gamma ray log runs about twelve hours after stimulation (and immediately before the spectral gamma ray log) in well 160 showed that the extensive activity seen earlier above 4070 feet had largely disappeared and that a hot zone had developed at the bottom of the hole. This is consistent with the theory that radioactive material had come out of suspension and consequently fallen downhole.

The temperature logs for these wells were not very useful. The temperature contrast between the formation and the fracturing fluid was not meaningful, and the effects of production prior to the stimulation treatment were clearly present.

The spectral gamma-ray logs (peak counting rates, background counting rates, etc.) were consistent with the gross gamma-ray logs. As expected, these quantities increased where there was tracer activity and, conversely, were lower where there was little or no radioactivity. From one point in the wellbore to another point in the wellbore, the ratio of the number of counts in the full energy peaks to the number of counts in the scattered background changed. The sum of the counting rates of all the Ir-192 peaks in the selected range was plotted against the background window count rate. This background or scattered counting rate was the total count rate in the energy interval from 220 keV to 250 kev.

Reference to FIGS. 4(a) through 4(d) shows that two principal trend lines appeared to be defined by each of the crossplots of the data, designated as lines A and B. Line A was above line B, so that it corresponded to sources that were closer to the sonde than those represented by line B. In light of the conclusions drawn from the standard gamma-ray logs, one can infer that the trend line A corresponded to radioactive material actually in the borehole and line B corresponded to radioactive material in place behind the casing. The points between the two lines can be interpreted to have been the result of mixture of the two conditions: that is, there was radioactive material in the borehole and behind the casing, but the borehole activity was not so strong that it concealed the contribution from behind the casing. The data falling below line B may have resulted from material being in place deep in the formation without the presence of any corresponding activity directly behind casing. Alternatively, these points may have indicated the presence of a greater thickness or higher density cement.

The data for wells 159 and 160 fell closely along line B, and the data for well 167 fell along line A. In well 166 part of the data set fell on one trend line and part fell on the other. These crossplots can be used to generate curves that show only those depth intervals of the gamma-ray log that represent material inside the borehole or, conversely, those intervals dominated by activity that was in place behind the casing. The data for all depths corresponding to points that fell within three standard deviations from trend line A on the crossplots were assigned to a curve labeled "Borehole Dominated Gamma Ray." The data for all other depths appeared on a curve labeled "Injection Dominated Gamma Ray." Based on these spectral gamma-ray logs, it was clear that all of the activity seen above 4090 feet on the gross gamma-ray log was due to material that is actually inside the borehole. Other borehole dominated zones appeared at 4097 feet, 4101 feet, and 4166 feet. On the basis of these logs, the measured fracture height was from 4090 to 4170 feet, or below.

Spectral gamma-ray data can be used to make improved estimates of vertical fracture heights following hydraulic stimulation. The present improved method using a spectral gamma ray logging tool can distinguish between radioactive material which is entrapped in the borehole and that which is in place behind pipe. It provides a useful quality control approach for selecting those zones in which tracer log information is reliable. This may prevent a mistaken interpretation about the amount of fracture height growth and whether the fracture has run into an adjacent zone or that a cement failure has occurred.

While this invention has been described with respect to various specific examples and embodiments, it is to be understood that the invention is not limited thereto and that it can be variously practiced within the scope of the following claims.

The embodiments of the present invention in which an exclusive property or privilege is claimed are as follows:

1. In a method for logging a well in a subterranean formation which formation has been fractured by injecting material tagged with at least one radioactive material into said formation through said well, the improvement comprising:
    a) using a spectral gamma-ray tool to measure the gamma ray counting rate occurring at at least one photo-peak area of the spectrum characteristic of said radioactive material,
    b) using a spectral gamma-ray tool to measure the gamma ray counting rate occurring in a reduced average energy area of said spectrum, and
    c) calculating the ratio of said photo-peak counting rate to said reduced energy counting rate, whereby a high ratio indicates radioactive material in or near said well and a low ratio indicates radioactive material injected into said formation.

2. The method of claim 1 wherein said reduced average energy area of said spectrum encompasses substantially the entire spectrum.

3. The method of claim 1 wherein said reduced average energy area of said spectrum encompasses a reduced energy area of said spectrum not including said photo-peak area of said spectrum.

4. The method of claim 1 wherein the counting rates at more than one photo-peak area are used to provide said ratio.

5. The method of claim 1 wherein said material is tagged with a plurality of radioactive materials.

6. The method of claim 5 wherein the number of said ratios to be provided equals the number of said radioactive materials.

7. The method of claim 5 wherein each of said radioactive materials has at least one different photo-peak area relative to the photo-peak areas of the other radioactive material or materials.

8. The method of claim 1 further including:
    repeating said steps a), b), and c) at a plurality of vertically displaced positions in said well, and
    plotting gamma ray counting rate versus depth for those positions where said calculated ratio indicates that radioactive material was not in or near the well,
    whereby the high count rate portions of said plot indicates the vertical height of said fracturing.

9. The method of claim 1 further including:

repeating said steps a), b, and c) at a plurality of vertically displaced positions in said well, and plotting said ratio versus depth, whereby the high ratio portions of said plot indicate the locations of fracturing.

10. A method for indicating the mean depth of penetration of one or more radioactive tracers injected from a well bore into fractures in a hydraulically fractured earth formation, said method comprising the steps of:

(1) detecting the intensity of gamma radiation from said one or more radioactive tracers and earth formations by a gamma ray detector positioned in a logging tool in the well bore adjacent to the fractured interval of earth formation and obtaining data representative of said radiation intensity;

(2) separating the gamma ray intensity data into an observed energy spectrum of detected gamma rays;

(3) obtaining from said observed energy spectrum, count rates of gamma radiation in two or more different energy ranges, at least one of which is sensitive primarily to unscattered and minimally Compton scattered gamma rays, and at least one other of which includes significant lower energy gamma rays having undergone Compton scattering prior to detection; and (4) combining said two or more count rates according to a predetermined relationship to produce a tracer penetration index which is indicative of the mean radial distance between the tracer and the detector in the logging tool.

11. The method of claim 10 wherein said separating steps include modification of the observed energy spectrum by removing therefrom background gamma radiation due to naturally occurring gamma rays in the formation from uranium, thorium, and potassium isotopes and their daughter products to obtain a modified spectrum representing solely the energy spectrum of the gamma radiation attributable to radioactive tracer elements.

12. The method of claim 11 wherein said naturally occurring gamma ray spectrum is obtained prior to the injection of radioactive tracer.

13. The method of claim 10 wherein said two or more different energy ranges are selected in regions of the energy spectrum where the effects of photoelectric absorption of the gamma radiation are negligible.

14. The method of claim 13 wherein said predetermined relationship is a ratio of the count rates of gamma radiation in said unscattered and minimally Compton scattered energy range to the count rates of gamma radiation in said lower energy range.

* * * * *